United States Patent [19]

Doerr et al.

[11] Patent Number: 4,470,036
[45] Date of Patent: Sep. 4, 1984

[54] SAFETY LIGHT WARNING SYSTEM FOR VEHICLES AND THE LIKE

[75] Inventors: John F. Doerr, 100 Lefferts Ave., Apt. 4-E, Brooklyn, N.Y. 11225; Richard L. Miller, Dix Hills, N.Y.

[73] Assignee: John F. Doerr, Brooklyn, N.Y.

[21] Appl. No.: 527,571

[22] Filed: Aug. 29, 1983

[51] Int. Cl.³ .............................................. B60Q 1/00
[52] U.S. Cl. ..................................... 340/66; 340/71; 340/52 F; 340/669; 200/61.45 R; 307/10 LS
[58] Field of Search ....................... 340/66, 69, 71, 72, 340/84, 62, 52 F, 669; 200/61.45 R, 61.53; 307/10 LS

[56] References Cited

U.S. PATENT DOCUMENTS

| | | | |
|---|---|---|---|
| 2,260,680 | 10/1941 | Nelsen | 340/66 |
| 2,751,522 | 6/1956 | Spangenberg | 340/66 |
| 3,281,786 | 10/1966 | Leichsenring | 340/72 |
| 3,444,514 | 5/1969 | Wang Yang | 340/66 |
| 3,676,844 | 7/1972 | Hendrickson | 340/71 |
| 3,702,459 | 11/1972 | Bauchan | 340/66 |

Primary Examiner—Donnie L. Crosland
Attorney, Agent, or Firm—Richard L. Miller

[57] ABSTRACT

An automobile signal system, having three modes of operation, stop, caution, and go. All three modes are energized by the automobile battery when the ignition switch is closed. The caution mode will operate only when neither the gas or brake pedals are pressed. The stop mode utilizes a relay to isolate its circuitry from that of the caution mode. The go mode utilizes a switch which is activated by an accelerator sensitive member.

11 Claims, 3 Drawing Figures

SAFETY LIGHT WARNING SYSTEM FOR VEHICLES AND THE LIKE

BACKGROUND OF THE INVENTION

This invention relates to automobile signals but more particularly to an automobile signal system utilizing three color coded lights to indicate driver foot position with respect to the brake and gas pedals.

The safety of vehicle operation depends greatly upon signals. The importance of providing effective signalling means for automobiles has long been recognized. Present day crowded highway conditions, high vehicle speeds, and increasing accident rates have triggered the demand for a more effective signalling system than has been provided by conventional brake lights.

INFORMATION DISCLOSURE STATEMENT

U.S. Pat. No. 2,128,769 to Finnell teaches a signal device with a plurality of signal lights, incorporating the accepted colors of red for a stop, green for normal driving and amber for caution indicating a slowing down of the speed of the vehicle. Each of the brake, clutch and accelerator pedals have switches operable through their movement.

U.S. Pat. No. 3,492,638 to lane teaches a vehicle with indicating lights which are cumulatively energized in proportion to the output of a speed changing means ( Engine intake manifold, brake system master cylinder).

U.S. Pat. No. 3,787,808 to Knopf teaches a signalling system whose operation progresses from an initial "gas off" stage with a first panel of given color and indicia illuminated, to an initial "braking" stage with a second panel of varied color and indicia illuminated, while the first panel is turned off to a "slow down" deceleration stage with a third panel of enlarged size and varied color and indicia illuminated, and with the first and second panels turned off, to a "slow-er" deceleration stage with a fourth enlarged panel of varied color and indicia under flashing illumination, while the third panel remains on, and to a "stop" stage with a fifth enlarged panel of varied color and indicia illuminated while the third and fourth panels are turned off.

U.S. Pat. No. 3,806,870 to Kalajian teaches a signalling system characterized by a double acting cylinder and piston unit wherein displacement follows inversely the positioning of the accelerator control of the vehicle, to activate a warning in response to fluid displacement as caused by moving the control toward a decelerating condition and to deactivate the warning in response to fluid displacement as caused by moving the control toward an accelerating condition.

SUMMARY OF THE INVENTION

Accordingly it is an object of the present invention to provide an automobile signal system that utilizes three color coded lights to indicate driver foot position with respect to the brake and gas pedals.

Another object of the present invention is to provide an automobile signal system which is placed in a readily viewed position on an automotive vehicle.

Yet another object of the present invention is to provide an automobile signal system employing signals that are automatically controlled so the driver of the leading vehicle need not operate separate switches or observe dash board lighting displays and thus enables him to concentrate on the safe operation of the vehicle.

Yet still another object of the present invention is to provide an automobile signal system which is readily understood.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DESCRIPTION OF THE INVENTION

Figure 1:
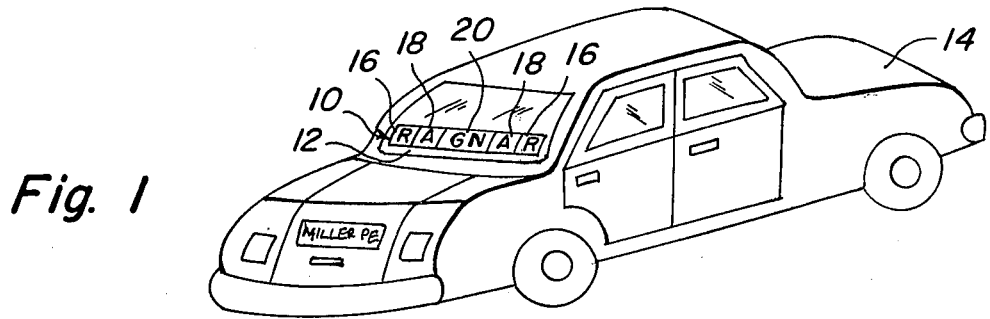
FIG. 1 is a perspective view of an automobile illustrating the typical incorporation of the invention therein.

In FIG. 1 the signal panel of the present invention is shown at 10, mounted on the rear luggage shelf 12 of the automobile 14. The signal system is operational in three modes. The "stop" mode operates the two red signals 16 located at the extremes of the signal panel 10. The "caution" mode operates the two amber signals 18 located on he signal panel 10 adjacent to the red signals 16. The "go" mode operates one green signal 20 located at the center of signal panel 10.

Figure 2:
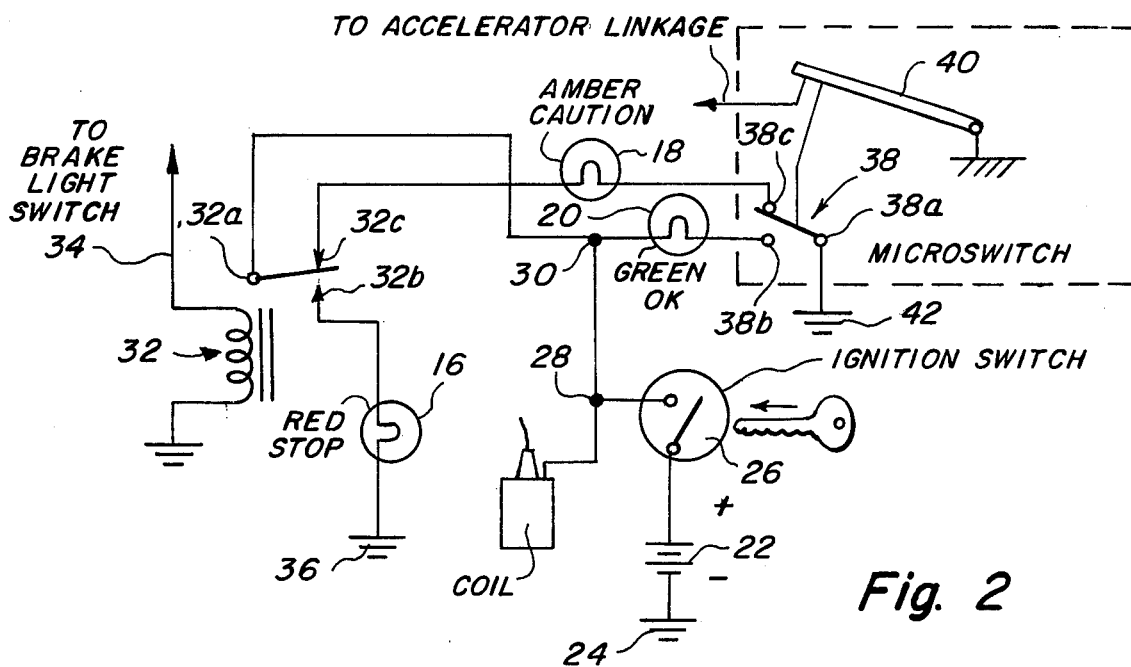
FIG. 2 is a schematic diagram of the preferred embodiment of the invention.

In FIG. 2 is shown the preferred embodiment of the automobile signal system circuitry. The signal system is energized by battery 22, which is grounded at 24, and is activated when the ignition switch 26 is closed. The circuitry of the "stop" mode is as follows. When ignition switch 26 is closed the current flows from battery 22 to terminal 28. From terminal 28 the current flows to terminal 30. From terminal 30 the circuit continues to terminal 32a of relay 32. Relay 32 is energized when brake pedal light switch 34 is activated and thus allowing the circuit to continue to terminal 32b of relay 32.

The circuit then continues from terminal 32b to red signal 16 and then to ground 36 to complete the "stop" mode circuitry. It is thus shown that the red signal 16 will only be activated when the brake pedal is pressed and the gas pedal released imparting a visual eye view signal for the vehicle behind.

The circuitry of the "caution" mode is as follows. When ignition switch 26 is closed the circuit continues from battery 22 to terminal 28. From terminal 28 the circuit continues to terminal 30. From terminal 30 the circuit continues to terminal 32a of relay 32. Relay 32 is unenergized when the brake pedal light switch 34 is deactivated thus allowing the circuit to continue to terminal 32c of relay 32.

The circuit then continues from terminal 32c to amber signal 18 and then to terminal 38c of microswitch 38. Gas pedal 40 is linked directly to microswitch 38. Thus when gas pedal 40 is released, the circuit at terminal 38c will continue to terminal 38a and then to ground 42 to complete the "caution" mode circuitry. It is thus shown that the amber signal 18 will only be activated when both the gas and brake pedals are released imparting a visual eye view signal for the vehicle behind.

The circuitry of the "go" mode is as follows. When recognition switch 26 is closed the circuit continues from battery 22 to terminal 28. From terminal 28 the circuit continues to terminal 30 and then to green signal 20. From green signal 20 the circuit continues to terminal 38b of microswitch 38. Thus when gas pedal 40 is pressed, the circuit at terminal 38b will continue to terminal 38a and then to ground 42 to complete the "go" mode circuitry. It is thus shown that the green signal 20 will only be activated when the gas pedal is pressed and the brake pedal is released.

Figure 3:
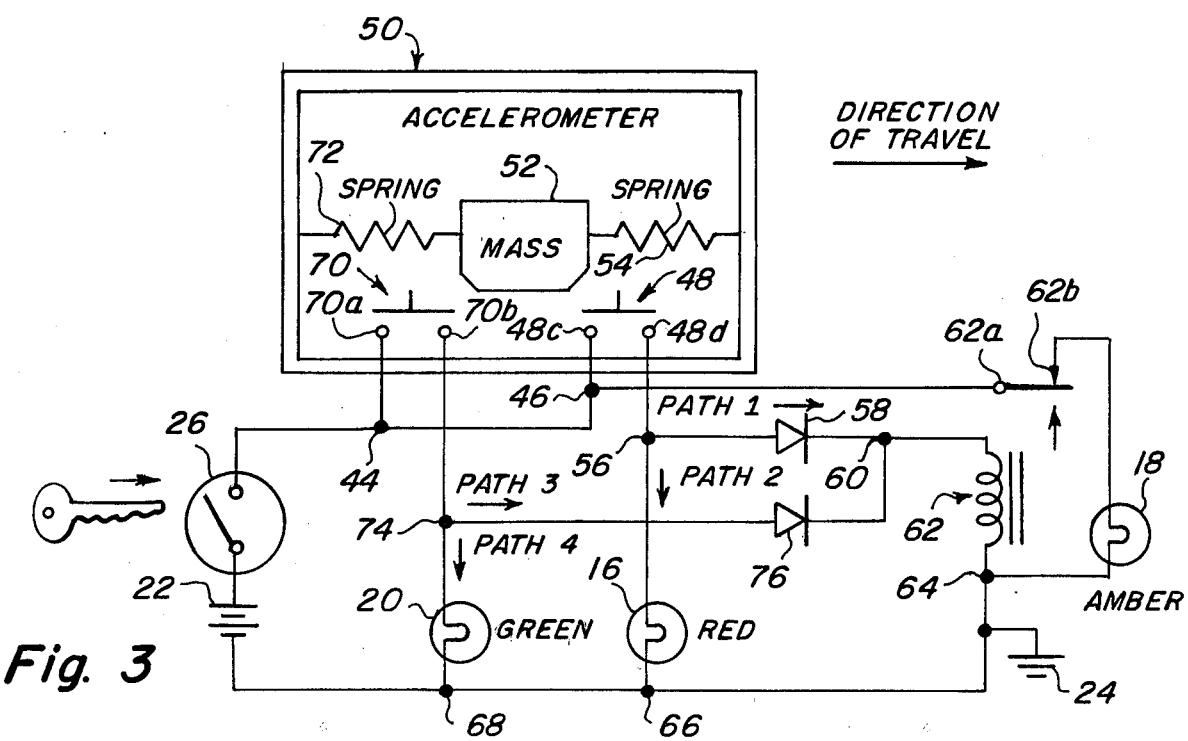
FIG. 3 is a diagram of a second embodiment of the invention.

An alternate embodiment of the automobile signal system circuitry is shown in FIG. 3. The signal system is energized by battery 22, which is grounded at 24, when the ignition switch 26 is closed. The circuitry of the "stop" mode is as follows. When ignition switch 26 is closed the circuit continues from battery 22 to terminal 44. The circuit then continues to terminal 46 and then to terminal 48c of switch 48 of accelerometer 50. When the automobile decelerates, mass 52 biased by spring 54 will move in the direction of travel causing switch 48 to close allowing the circuit to continue from terminal 48c to terminal 48d. The circuit continues from terminal 48d to terminal 56 where it now traverses two paths (1 & 2). In path 1 the circuit continues from terminal 56 through diode 58 to terminal 60 through energized relay 62 to terminal 64 through terminals 66 and 68 and back to battery 22. In path 2 the circuit continues from terminal 56 to red signal 16 to terminal 66 through terminal 68 to battery 22 to complete the "stop" mode circuitry.

The circuitry of the caution mode is as follows. When ignition switch 26 is closed the circuit continues from battery 22 to terminal 44 to terminal 46. The circuit continues from terminal 46 to terminal 62a of unenergized relay 62. The circuit continues from terminal 62a to terminal 62b to amber signal 18 to terminal 64 to terminal 66 to terminal 68 to battery 22 to complete the "caution" mode circuitry.

The circuitry of the "go" mode is follows. When ignition switch 26 is closed the circuit continues from battery 22 to terminal 44 to terminal 70a of switch 70 of accelerometer 50. When the automobile accelerates, mass 52 biased by spring 72 is moved in the direction opposite to the direction of travel causing switch 70 to close allowing the circuit to continue from terminal 70a to terminal 70b.

The circuit continues from terminal 70b to terminal 74 where it now traverses two paths (3 & 4). In path 3 the circuit continues from terminal 74 through diode 76 to terminal 60 through energized relay 62 to terminal 64. The circuit continues from terminal 64 through terminals 66 and 68 and back to battery 22. In path 4 the circuit continues from terminal 74 through green signal 20 to terminal 68 to battery 22 to complete the "go" mode circuitry.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An automobile signal system comprising:
   (a) a stop mode circuitry;
   (b) a caution mode circuitry;
   (c) a go mode circuitry;
   (d) said stop, caution, and go modes circuitry all being capable of being energized by the automobile battery when the ignition switch is closed;
   (e) said stop mode circuitry utilizing a red lamp, operative by means of the automobile brake pedal, said caution mode circuitry utilizing an amber lamp, and said go mode circuitry utilizing a green lamp operative by means of the automobile gas pedal;
   (f) circuit means for interconnecting said caution mode circuitry as to be operational whenever neither the gas pedal nor the break pedal is pressed;
   (g) said stop mode circuitry utilizing a relay to isolate its circuitry from the caution mode;
   (h) said go mode circuitry utilizing a switch which is activated by an accelerating sensitive member, and
   (i) circuit interconnection means between said stop mode circuitry and said go mode circuitry for preventing both the red lamp and the green lamp from being operated simultaneously.

2. The automobile signal system as in claim 1 wherein said stop mode circuitry comprises said battery connected to said ignition switch which is connected to said relay, said relay connected to said red lamp; said relay being energized by the operation of the vehicle brake light switch.

3. The automobile signal system as in claim 1, wherein said caution mode circuitry comprises said battery connected to said ignition switch which is connected through a contact pair of said relay connected to said amber lamp and said amber lamp is connected to said acceleration sensitive member; when said relay is unenergized.

4. The automobile signal system as in claim 3, wherein said acceleration sensitive member is a microswitch fixedly attached to said gas pedal.

5. The automobile signal system as in claim 1, wherein said "go" mode circuitry comprises said battery connected to said ignition switch which is connected to said green lamp and said green lamp connected to said acceleration sensitive member.

6. The automobile signal system as in claim 5, wherein said acceleration sensitive member is a microswitch fixedly attached to said has pedal.

7. The automobile signal system as in claim 1, wherein said stop mode circuitry comprises said battery connected to said ignition switch which is connected to said accelerated sensitive member whose output traverses a first path and a second path; said first path incorporates a first diode connected to said relay, which is energized and is connected to said battery; said second path incorporates said red lamp connected to said battery; said first and second paths traversed simultaneously.

8. The automobile signal system as in claim 7, wherein said accelerated sensitive member is an accelerometer.

9. The automobile signal system as in claim 1, wherein said caution mode circuitry comprises said battery connected to said ignition switch which is connected to said relay, said relay connected to said amber light and said amber light connected to said battery; said relay being unenergized.

10. The automobile signal system as in claim 1, wherein said go mode circuitry comprises said battery connected to said ignition switch which is connected to said accelerated sensitive member whose output traverses a third path and a fourth path; said third path incorporates a second diode connected to said relay which is energized and is connected to said battery; said fourth path incorporates said green lamp connected to said battery; said third and fourth paths traversed simultaneously.

11. The automobile signal system as in claim 10 wherein said accelerated sensitive member is an accelerometer.

* * * * *